(12) United States Patent
Gottesfeld et al.

(10) Patent No.: US 8,304,368 B2
(45) Date of Patent: Nov. 6, 2012

(54) CATALYST COATED MEMBRANE (CCM) AND CATALYST FILM/LAYER FOR ALKALINE MEMBRANE FUEL CELLS AND METHODS OF MAKING SAME

(75) Inventors: Shimshon Gottesfeld, Niskayuna, NY (US); Dario Dekel, Ramat Yishay (IL); David Stanislav Simakov, Nazareth Elite (IL)

(73) Assignee: Cellera, Inc., Niskayuna, NY (US)

( * ) Notice: Subject to any disclaimer, the term of this patent is extended or adjusted under 35 U.S.C. 154(b) by 439 days.

(21) Appl. No.: 12/710,539

(22) Filed: Feb. 23, 2010

(65) Prior Publication Data

US 2010/0216052 A1   Aug. 26, 2010

Related U.S. Application Data

(63) Continuation-in-part of application No. 12/477,669, filed on Jun. 3, 2009.

(60) Provisional application No. 61/154,622, filed on Feb. 23, 2009.

(51) Int. Cl.
*B01J 23/48* (2006.01)
(52) U.S. Cl. ........................ 502/347; 502/439
(58) Field of Classification Search .................. 429/428; 502/347, 348, 439
See application file for complete search history.

(56) References Cited

U.S. PATENT DOCUMENTS

| | | | |
|---|---|---|---|
| 3,909,206 A | 9/1975 | Katz | |
| 4,191,453 A | 3/1980 | Beni et al. | |
| 4,253,922 A | 3/1981 | Welch | |
| 4,910,099 A | 3/1990 | Gottesfeld | |
| 5,082,550 A | 1/1992 | Rishpon et al. | |
| 5,108,573 A | 4/1992 | Rubinstein et al. | |
| 5,227,042 A | 7/1993 | Zawodzinski et al. | |
| 5,366,821 A | 11/1994 | Merritt et al. | |
| 5,368,717 A | 11/1994 | Gottesfeld et al. | |
| 5,527,640 A | 6/1996 | Rudge et al. | |
| 6,140,466 A | 10/2000 | Barbas, III et al. | |
| 6,203,936 B1 | 3/2001 | Cisar et al. | |
| 6,221,523 B1 | 4/2001 | Chun et al. | |
| 6,242,568 B1 | 6/2001 | Barbas, III et al. | |
| 6,296,964 B1 | 10/2001 | Ren et al. | |
| 6,356,433 B1 | 3/2002 | Shi et al. | |
| 6,383,640 B1 | 5/2002 | Shi et al. | |
| 6,458,479 B1 | 10/2002 | Ren et al. | |
| 6,488,837 B1 | 12/2002 | Ren et al. | |
| 6,686,081 B2 | 2/2004 | Gottesfeld | |
| 6,696,382 B1 | 2/2004 | Zelenay et al. | |
| 6,821,658 B2 | 11/2004 | Acker et al. | |
| 6,824,899 B2 | 11/2004 | Acker et al. | |
| 6,841,283 B2 | 1/2005 | Breault | |
| 6,890,680 B2 | 5/2005 | Beckmann et al. | |
| 6,936,368 B2 | 8/2005 | Hirsch et al. | |
| 6,962,760 B2 | 11/2005 | Rice et al. | |
| 6,981,877 B2 | 1/2006 | Ren et al. | |
| 6,986,961 B1 | 1/2006 | Ren et al. | |
| 6,991,865 B2 | 1/2006 | Acker et al. | |
| 7,083,708 B2 | 8/2006 | Chlistunoff et al. | |
| 7,179,501 B2 | 2/2007 | Beckmann et al. | |
| 7,282,293 B2 | 10/2007 | Ren et al. | |
| 7,332,241 B2 | 2/2008 | Jaouen | |
| 7,407,721 B2 | 8/2008 | Ren et al. | |
| 7,510,794 B2 | 3/2009 | Gottesfeld et al. | |
| 7,541,109 B2 | 6/2009 | Ren et al. | |
| 7,638,215 B2 | 12/2009 | Ren et al. | |
| 2002/0034675 A1 | 3/2002 | Starz et al. | |
| 2002/0086193 A1 | 7/2002 | Acker et al. | |
| 2002/0122966 A1 | 9/2002 | Acker et al. | |
| 2003/0031907 A1 | 2/2003 | Gottesfeld | |
| 2003/0143448 A1 | 7/2003 | Keefer | |
| 2003/0157395 A1 | 8/2003 | Ren et al. | |
| 2003/0157396 A1 | 8/2003 | Beckmann et al. | |
| 2004/0023086 A1 | 2/2004 | Su et al. | |
| 2004/0062980 A1 | 4/2004 | Ren et al. | |
| 2004/0069144 A1 | 4/2004 | Wegeng et al. | |
| 2004/0076859 A1 | 4/2004 | Gottesfeld | |
| 2004/0166401 A1 | 8/2004 | Srinivas | |
| 2004/0191584 A1 | 9/2004 | Rice et al. | |
| 2004/0209136 A1 | 10/2004 | Ren et al. | |
| 2004/0209143 A1 | 10/2004 | Hirsch et al. | |
| 2004/0209154 A1 | 10/2004 | Ren et al. | |
| 2004/0265680 A1 | 12/2004 | Ren et al. | |
| 2005/0026005 A1 | 2/2005 | Chlistunoff et al. | |
| 2005/0053811 A1 | 3/2005 | Acker et al. | |
| 2005/0147862 A1 | 7/2005 | Knoop et al. | |
| 2005/0170224 A1 | 8/2005 | Ren et al. | |
| 2005/0181271 A1 | 8/2005 | Ren et al. | |
| 2005/0196666 A1 | 9/2005 | Gottesfeld et al. | |
| 2005/0227140 A1 | 10/2005 | Beckmann et al. | |
| 2006/0068271 A1 | 3/2006 | Ren et al. | |
| 2006/0266642 A1 | 11/2006 | Akle et al. | |
| 2006/0286429 A1 | 12/2006 | Shiepe et al. | |
| 2007/0128500 A1 | 6/2007 | Marsacq et al. | |
| 2008/0008921 A1 | 1/2008 | Miura | |
| 2008/0032182 A1 | 2/2008 | Ren et al. | |
| 2008/0115875 A1 | 5/2008 | Jeng et al. | |
| 2008/0145721 A1 | 6/2008 | Shapiro et al. | |
| 2008/0156549 A1 | 7/2008 | Leboe et al. | |

(Continued)

OTHER PUBLICATIONS

Drese et al., "Synthesis-Structure-Property Relationships for Hyperbranched Aminosilica CO2 Adsorbents", Advanced Functional Materials, 19:3821-3832 (2009).

(Continued)

*Primary Examiner* — Edward Johnson
(74) *Attorney, Agent, or Firm* — Mintz, Levin, Cohn, Ferris, Glovsky and Popeo, P.C.

(57) ABSTRACT

Alkaline membrane fuel cells designed with silver cathode catalysts include a catalyst layer comprising silver metal nano-particles and an anion-conducting ionomer. The silver nano-particles are mixed with a solution of the ionomer to form a catalyst ink that is applied to an alkaline membrane to form an ultra-thin cathode catalyst layer on the membrane surface.

21 Claims, 4 Drawing Sheets

U.S. PATENT DOCUMENTS

| | | |
|---|---|---|
| 2008/0166542 A1 | 7/2008 | Sung et al. |
| 2008/0184882 A1 | 8/2008 | White |
| 2008/0187824 A1 | 8/2008 | Tomantschger |
| 2008/0206616 A1 | 8/2008 | Atanassova et al. |
| 2009/0004529 A1 | 1/2009 | Gur et al. |
| 2009/0042092 A1 | 2/2009 | Martinent et al. |
| 2010/0021777 A1 | 1/2010 | Gottesfeld et al. |
| 2010/0216052 A1 | 8/2010 | Gottesfeld et al. |

OTHER PUBLICATIONS

International Search Report for PCT/US2010/025005, dated Apr. 21, 2010.

CATALYST COATED MEMBRANE (CCM) AND CATALYST FILM/LAYER FOR ALKALINE MEMBRANE FUEL CELLS AND METHODS OF MAKING SAME

RELATED APPLICATIONS

This application is related to U.S. Provisional Application Ser. No. 61/154,622, filed Feb. 23, 2009, to which priority is claimed and the entirety of which is incorporated herein by reference. This application is also related to U.S. patent application Ser. No. 12/477,669, filed Jun. 3, 2009, the entirety of which is herein incorporated by reference.

FIELD OF THE INVENTION

The invention provides an alkaline membrane fuel cell designed with a silver cathode catalyst.

BACKGROUND

Alkaline membrane fuel cells in principle can operate without added liquid electrolyte(s) and thereby rely fully on the ionic conductivity of well-hydrated, anion conducting membranes configured to conduct hydroxide ions ($OH^-$). A liquid electrolyte-free mode of operation has strong advantages in comparison to liquid electrolyte-based fuel cells, as the wide selection of PEM fuel cell technologies employing proton conducting membrane electrolytes shows. Compared to the more established and developed PEM fuel cell technologies, the alkaline membrane fuel cell (AMFC) has great advantages with respect to using catalysts other than expensive platinum group metals and employing inexpensive metal hardware. An exemplary AMFC is described in the above mentioned U.S. patent application Ser. No. 12/477,669, filed Jun. 3, 2009, and assigned to the same assignee of the present invention. On the other hand, the AMFC poses a significant challenge derived from its use of $OH^-$ ion conducting polymers that demonstrate a more limited ionic conductivity. In addition, the high sensitivity of this ion conductivity to the water levels of an operating AMFC poses an additional challenge. Ionic conductivity challenges manifest themselves particularly in the composition and the mode of fabrication of the two catalyst layers that bond to the major surfaces of the membrane electrolyte to form the catalyst-coated membrane (CCM). These composition and fabrication challenges are more severe with an AMFC design because the effective specific ionic conductivity within the catalyst layer is, typically, an order of magnitude lower than that of the membrane electrolyte. This is because the ionic material of the catalyst layer fills only a fraction of its total volume. In addition, the precise details of the morphology of the ionic network that results from mixing the catalyst and the ionomer material determines whether the ionic network enables effective ionic access through the thickness of the catalyst layer, as is required for high catalyst utilization.

Figure 1:
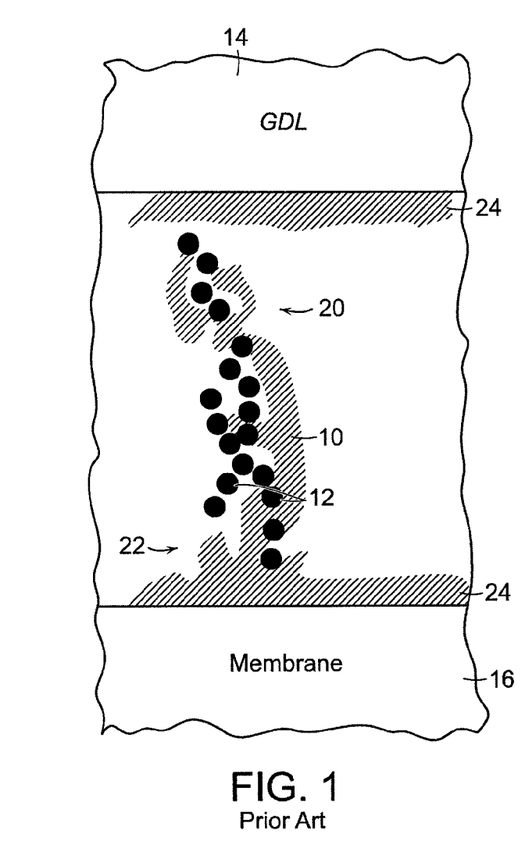
FIG. 1 illustrates a cross-sectional view of a prior art fuel cell membrane/electrode assembly including a gas diffusion layer (GDL), an ion conducting membrane, and a cathode catalyst layer positioned therebetween including at least an ionomer and metallic metal catalyst particles.

FIG. 1 includes a schematic illustration of a prior art catalyst layer formed from mixtures of an ion-conducting polymer/ionomer 10 (shaded haze) and metal catalyst particles 12 (spheres) disposed in a catalyst layer between a porous carbon gas diffusion layer (GDL) 14 and a cell membrane (membrane) 16. One might expect that in a desirable catalyst microstructure the cohabitating networks of metal catalyst 12 and ionomer 10, as shown in FIG. 1, each provide good connectivity through the thickness dimension of the catalyst layer, as well as good ionic access to a large fraction of the catalyst sites. As depicted in FIG. 1, the ionomer volume fraction is relatively high. One therefore might expect, at least in principle, an effective ionic conductivity in this catalyst layer. This catalyst layer reflects the state-of-the-art approach of enhancing ionic conductivity in an AMFC catalyst based on use of a high fraction of recast ionomer in the catalyst mix. However, the catalyst structure of FIG. 1 likely has significant drawbacks. For instance, the high volume fraction of the ionic material 10 can tend to isolate the metal catalyst particles 12 from each other, as indicted by arrows 20 and 22 in FIG. 1, such that electronic contact of the catalyst particles to the electron current collector along the side of the gas diffusion layer 14 is compromised. As a result, these catalyst particles 12 can be totally inactive.

Furthermore, a crust 24 of excess recast polymer electrolyte 10 will tend to form on both major surfaces of the catalyst layer, as shown in FIG. 1. These crusts 24 can thereby define the nature of interfaces of the catalyst layer with the membrane and with the gas diffusion layer 14. A potential problem with such interfacial crust 24 is that the state of the water level or hydration within an active part of the catalyst layer may be determined by the water transport and water capacity characteristics of these interfacial crusts 24. For example, dry-out of an ionomer crust 24 formed between the AMFC cathode catalyst layer and the alkaline electrolyte membrane 16 could slow the rate of re-hydration of the catalyst layer because the crust 24 needs re-hydration as a prerequisite for effective re-hydration of the catalyst-containing part of the layer. An excess of ionomer at an interface of the catalyst layer with the gas diffusion layer will cause high electronic resistance between the gas diffusion layer and the metal catalyst particles, leading potentially to an electronic disconnect.

One may draw the conclusion from these observations and arguments that an optimum volume fraction of $OH^-$ ion conducting ionomer is a basis and an objective for fine tuning catalyst ink preparations and applications in order to achieve highly performing AMFC cathodes. This objective proves difficult to achieve. Relevant reports published to date disclose that the maximum power density that $H_2/O_2$ AMFCs with platinum (Pt) catalysts achieved is 100-200 mW/cm$^2$. Importantly, once a non-precious metal catalyst replaces the Pt cathode catalyst, the maximum AMFC power density achieved to date is about 50 mW/cm$^2$. It is understood that the relative low performance of AMFCs with Pt catalysts versus that of Pt-catalyzed PEMFCs is the result of the relatively low ionic ($OH^-$) conductivity in the recast ionomer material used as the bonding agent and ionic conductor in the AMFC catalyst layer. The performance penalty that results from the lower conductivity of the $OH^-$ conducting ionomer is exacerbated further by the low catalyst activity of non-Pt catalysts reported to date. The low AMFC performance achieved thus far has cast serious doubts on the ability to reduce to practice the central AMFC advantage of using non-Pt catalysts.

Clearly, the critical requirement for reducing AMFC technology to practice has been the development of an optimal catalyst layer composition and structure based on a non-Pt catalyst and a recast alkaline electrolyte membrane material that will enable good ionic and electronic connectivity through the catalyst layer, as well as prevent the formation of ionomer crusts. In addition, another critical requirement includes packaging a sufficiently large surface area of the catalyst into an overall thickness of the catalyst layer that does not exceed several micrometers, such as less than 10 micrometers. Fulfilling this requirement may soften the demand for a high specific conductivity of the recast ionomer because the overall limited thickness of the catalyst layer caps the maximum length of ionic routes to the active catalyst sites.

In the more fully developed area of CCM fabrication for PEM fuel cells, the catalyst of choice has been carbon-supported Pt. In addition, the carbon support of choice has been carbon XC-72, a product available from Cabot Corporation of Billerica, Mass. An important feature of this type of high surface area carbon is its "very open" structure. Carbon powder is mixed with recast Nafion® available from DuPont of Wilmington, Del. This composite mixture is laid down as a thin layer and a void fraction of about 50% is maintained. The open structure on micron and sub-micron scales is ascribed to the XC-72 material. This high void volume of catalyst material appears to be an important enabler to achieve an effective micrometer scale "interweave" between the carbon and the recast ionomer. Moreover, this "interweave" structure appears to be a key to leaving some open space for gas penetration into the composite catalyst layer.

Recent attempts to use non-Pt catalysts in AMFC designs are based to a significant degree on similar high-surface area carbon supports with the Pt catalytic sites replaced by catalyst centers based typically on adsorbed and heat-treated cobalt complexes. In the latter case, the AMFC performance obtained was quite low due to the relatively very low packing density of the catalyst and due to the weight % of cobalt centers, which are not more than 1% of the total weight of the carbon-supported catalyst. Consequently, a thick layer of the catalyst is required to contain enough of the active catalytic centers. With the conductivity of the recast anion-exchange membrane (AEM) material limited, effective access to a large number of catalyst sites located well inside the thickness of the relatively thick catalyst layer could not be sustained.

In principle, a catalyst layer employing a dispersed and unsupported metal catalyst is a potential solution to the needs of tighter packaging of the catalyst surface area whereby the volume of the support material is eliminated and thereby the volume occupied by the electronically conducting material is filled with metal catalyst particles. The well-known drawback of this alternative is that the degree of dispersion achievable in such metal "blacks," of unsupported metal particles, is significantly smaller versus the case of carbon-supported catalysts because of the high tendency of the unsupported metal particles to agglomerate.

The discussion above indicates that certain features of the metal catalyst that one employs in a high performing CCM of an AMFC design are important and are required in addition to the conductivity and stability requirements of the recast ionomer used in the catalyst layer and the demands of an effective mode of CCM fabrication. Hence, a need exists in the art for AMFC designs and methods that provide non-Pt metal catalysts with certain features and structures and that meet certain requirements needed to achieve AMFC power densities of the same order as power densities generated by Pt catalyst based PEM fuel cells. In addition to the special morphological features sought for the catalyst, a specific metal for preparation of the cathode catalyst for AMFCs was sought. This search is directed by the need for an optimized surface chemical activity versus oxygen atoms and the stability of the metal in the alkaline membrane medium.

One other critical factor in the successful application of catalyst layers to membranes of the type used in AMFCs is the quality of the interlayer bond at the catalyst layer-membrane interface. A catalyst-coated-membrane (CCM) must withstand many hours of cell operation, involving strongly varying degrees of hydration. The repetitive change in ionomer state of hydration causes repetitive polymer dimensional changes and, consequently, will cause delamination along the catalyst/membrane interface unless the interfacial bond is very robust. Typical AMFC membranes and ionomers have poly(arylene) backbones and, consequently, hardly flow at the highest temperatures allowed by polymer chemo-thermal stability limits. This is to be contrasted with the per-fluorocarbon backbone of mainstream proton conducting membranes. In the latter, hot pressing the catalyst layer to the membrane does result in a robust bond, thanks to the significant thermoplasticity of the ionomeric material in the catalyst layer and in the membrane that is achievable under the chemo-thermal stability limit. This difference in thermo-plasticity makes it impossible to copy directly the catalyst layer/membrane lamination process from the mainstream PEM fuel cell technology. Alternative modes of catalyst layer/membrane interfacial bonding, therefore, must be devised for AMFC CCMs and once ionomer-ionomer interdiffusion is ruled out. A remaining option is embedding solid catalyst particles into the surface of the membrane to generate anchoring sites. The latter process can be facilitated by solvents that open up the nano-pores in the membrane surface by controlled swelling of the outer membrane surface. We have concluded that, for the latter mode of interfacial bonding, the ionomer level in the catalyst ink cannot be too high, because the highest probability of penetration of a solid catalyst particle into the membrane surface is achieved when "neat" catalyst powder is pressed onto the membrane surface, with no intervention by some added ionomeric "binder". The binder may be required, however, for structural stabilization in the "bulk" of the catalyst layer, as well as for the benefit of ionic conductivity in the catalyst layer. Consequently, we concluded that, when the bond is to be based on membrane-embedded metal particles serving as anchors for the catalyst layer, the ionomer content in the ink has to be significantly lower than the volume ratio of ionomer:metal, 1:1, typically employed in PEM fuel cell catalyst inks, but it should not go down all the way to zero.

Finally, fuel cell cathode catalyst layers based on unsupported metal particles, have an intrinsic stability advantage vs. catalyst layers based on carbon-supported metal particles. The carbon support in a cathode catalyst is vulnerable to oxidative loss, particularly near open circuit conditions and under higher cell temperatures. The carbon support is more readily attacked than the metal; hence, elimination of the support to fully rely on a metal "black" as cathode catalyst has a important advantage in cell longevity.

SUMMARY OF THE INVENTION

In one aspect, the invention provides a catalyst coated membrane (CCM) for use in an alkaline membrane fuel cell (AMFC) comprising an anion conducting alkaline membrane, and a catalyst layer applied adjacent the membrane. The catalyst layer comprises a metal nano-powder and an ion conducting ionomer.

Implementations of the invention may include one or more of the following features and capabilities. The metal nano-powder comprises silver-containing nano-particles. The silver-containing nano-particles include a silver alloy. The silver nano-particles have an effective density of about 0.25 g/cm$^3$. The silver nano-particles form an open nano-powder structure. The ionomer comprises a polymer with a poly (arylene) backbone. The weight ratio of the ionomer to the silver nano-particles is about 0 to 10%. The volume ratio of ionomer:silver is in a range of about 1:0.7 to about 1:1.5, or is in a range of about 1:0.9 to about 1:1.1. The silver-containing nano-particles are mixed with the ion-conducting ionomer to form an ink which is applied to the anion conducting membrane by spraying, or other applicable techniques. The CCM membrane is positioned during ink application on a heated vacuum table. The dry membrane is exposed to a solvent, which selectively swells the membrane surface to promote catalyst layer bonding to the membrane surface. The metal nano-powder and ionomer are applied to the anion conducting alkaline membrane by screen printing onto the membrane. The silver-containing nano-powder and ionomer are mixed to form an ink and are applied to a Teflon®-coated film blank. The blank serves as a platform to (a) support the metal nano-metal and ionomer and (b) transfer the ink to the membrane surface. The ink is comprised of a mixture of silver containing nano-particles and a solution of an OH-ion conducting ionomer in a solvent. The OH-ion conducting ionomer can be selected from among poly(arylenes) with tetra-alkyl ammonium hydroxide functional groups with functional group densities between 1.5 and 3.5 milli-equivalents per gram. Selection of the OH-ion conducting ionomer is based on the ability to absorb liquid water to increase ionic conductivity and to retain a high level of hydration in the cathode catalyst layer during cell operation. The silver-containing particles are a size from about 5 nm to about 50 nm in diameter. The silver-coating particles have a void powder factor over about 90%.

In another aspect, the invention provides a method of making a catalyst coated membrane (CCM). The method comprises stages or steps, and the method may be altered, e.g., by having stages or steps added, removed, and/or rearranged. The method comprises: (a) providing a source of silver-containing nano-particles, (b) providing a source of hydroxide ion OH-conducting ionomer material, (c) adding the silver-containing nano-particles to a solution of the OH-conducting ionomer material to form a catalyst ink, (d) applying the catalyst ink to a cathode side surface of an alkaline membrane, and (e) applying one or more of heat and pressure to catalyst ink and membrane to secure the ink to the membrane.

In a further aspect, the invention provides a cathode catalyst layer for use in a catalyst coated membrane (CCM) in an alkaline membrane fuel cell (AMFC) comprising a metal nano-powder, and an ion conduction ionomer.

Implementations of the invention may include one or more of the following features and capabilities. The metal nano-powder comprises silver-containing particles.

BRIEF DESCRIPTION OF DRAWINGS

A further understanding of the inventions may be realized by reference to the figures that are described below and, although not drawn to scale, are illustrative of the principles and elements of the inventions.

DETAILED DESCRIPTION

Figure 2:
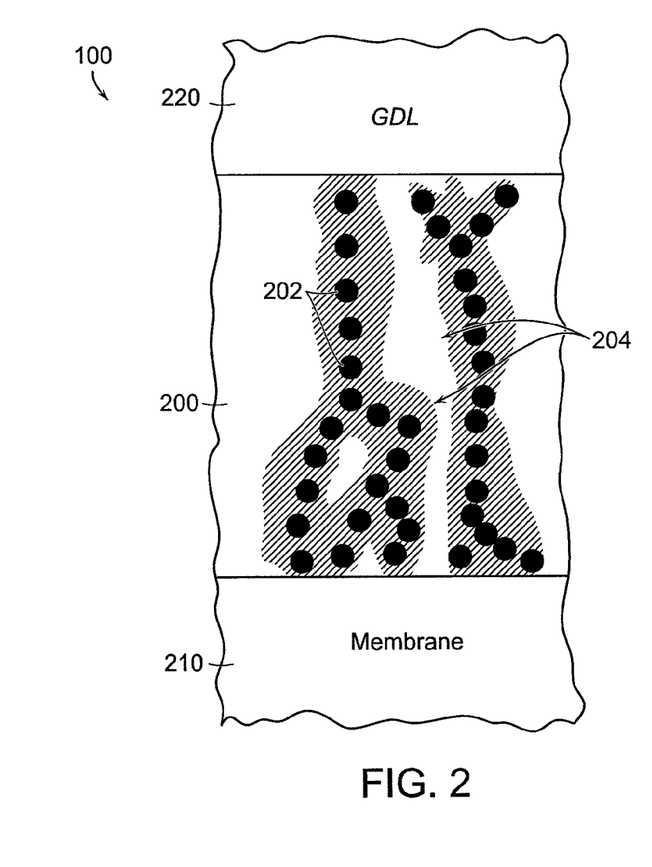
FIG. 2 illustrates a cross-sectional view of a cathode catalyst film/layer and an ion conducting membrane according to one aspect of the invention.

Referring to FIG. 2, in one aspect, the invention provides a catalyst coated membrane (CCM) 100. The CCM 100 includes a cathode catalyst film/layer 200 disposed along a cathode side of an ion conducting alkaline membrane 210, which is configured for use in an alkaline membrane fuel cell (AMFC). A gas diffusion layer (GDL) 220 is disposed along a side of the cathode catalyst film/layer 200 that is not facing the cathode side of the alkaline membrane 210. In addition, the CCM 100 includes an anode catalyst film/layer (not shown) disposed along an anode side of the alkaline membrane 210, opposite to the cathode side of the membrane 210, and a gas diffusion layer (not shown) disposed along the anode catalyst film/layer.

The catalyst film/layer 200 comprises at least two components including a volume of metal nano-powder intermixed with a volume of an ion conducting ionomer 204 to define the cathode catalyst film/layer. The metal nano-powder includes metal particles 202, each having an average particle diameter in a range of from about 5 nanometers (nm) to about 50 (nm), and preferably from about 20 nm to about 30 nm. The relatively small average particle size of the metal nano-powder particles 202 helps to define a relatively high specific conducting catalyst surface area ($m^2/g$) within the structure of the catalyst film/layer 200. A preferred catalyst powder based on metal nano-particles 202 also maintains a relatively high void fraction, as described below. In addition, the metal nano-particles intermixed with the ion conducting ionomer 204 may be unsupported.

In a preferred embodiment of the invention, the unsupported metal nano-powder catalyst includes a silver nano-powder including silver particles 202. Silver was chosen as the metal catalyst based on at least two characteristics including the need for an optimized surface-chemical activity versus oxygen atoms and the stability of silver in the alkaline membrane medium. The invention, however, is not limited to silver, and it is expected that various silver alloys can be employed to form a catalyst and can help to improve at least either or both of the characteristics of the surface reactivity and the chemical stability. For purposes of disclosing the inventions, the term "silver" is used exclusively, but it is understood that the term "silver" is not limited to silver and can also include any silver alloy.

In one embodiment of the invention, the silver nano-powder can be obtained from either Nanostructured & Amorphous Materials, Inc. of Houston, Tex., or MKNano, a division of M.K. Impex of Canada.

Figure 3:
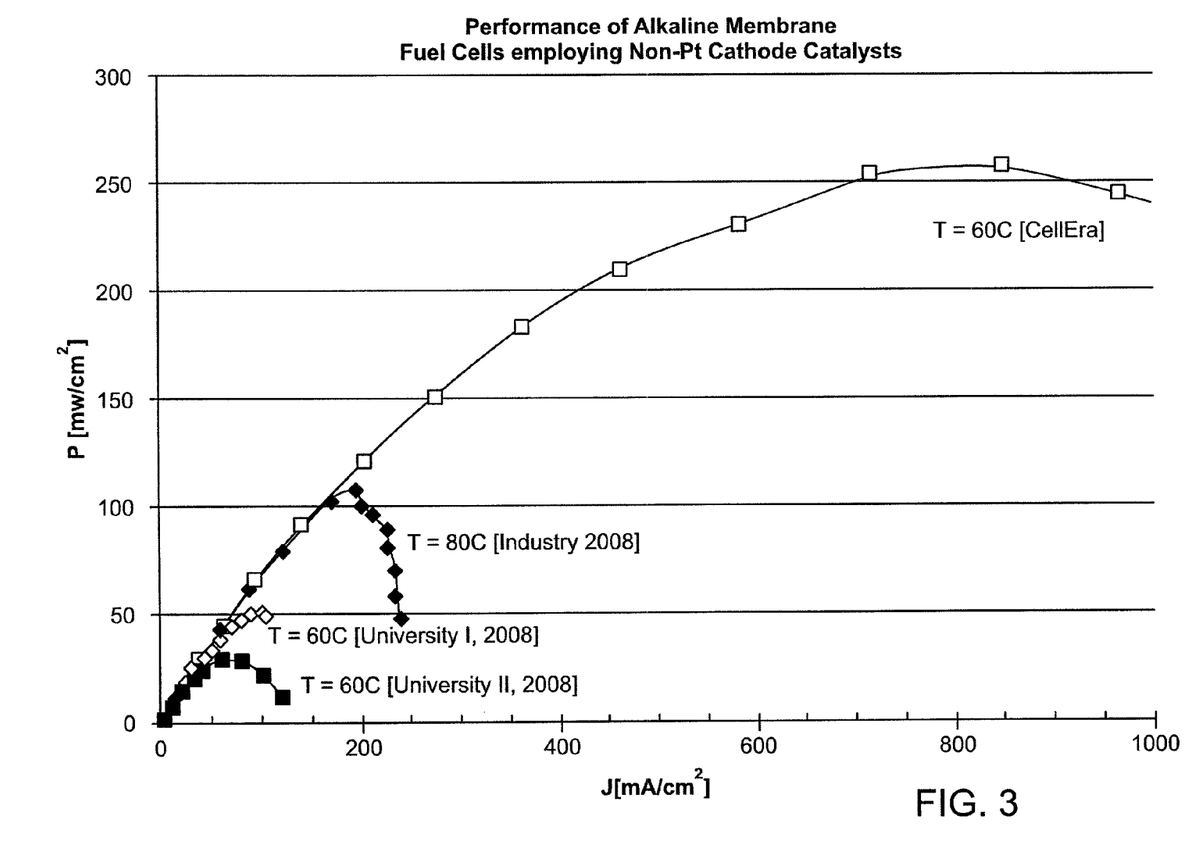
FIG. 3 is a graph illustrating the comparative performance results of alkaline membrane fuel cells (AMFC) with silver cathode catalysts according to the invention and with other prior art metal catalysts.

One interpretation of the successful results we have observed with the cathode catalyst film/layer 200 and the CCM 100 according to the invention, which are shown and described below with reference to FIG. 3, is that the well-separated silver particles 202 help to create an "open nano-powder structure." In addition, the high void fraction of the particle nano-powder 202 helps to create a high degree of openness of the nano-powder structure that may help intimate mixing of the silver particles 202 and the ionomer material at the micro and sub-micro levels to form the catalyst film/layer 200.

The ion conducting ionomer material is a material suitable for conducting hydroxide ions when this material is included as a component of a cathode catalyst film or layer along the alkaline membrane 210. The material may include, but is not limited to, quaternary ammonium-functionalized polymers.

These polymer(s) may have a polysulfone or another poly(arylene) backbone. For instance, these polymers may include a polymer with a polysulfone backbone and with quaternary ammonium hydroxide groups carried on tethers anchored on the polymeric backbone (QAPS).

The cathode catalyst film/layer 200 forms through mixing a volume of the silver nano-powder with a solution of a volume of the ion conducting ionomer to form a catalyst mixture or "ink" that is applied to the alkaline membrane 210. The silver nano-powder particles 202 disperse throughout the mixture such that, when the mixture is applied to the alkaline membrane 210, the silver catalyst particles 202 are dispersed substantially throughout the catalyst film/layer 200. The relative volumes of the ion conducting ionomer material to the volume of the silver nano-powder employed to formulate the catalyst "ink," and to form the catalyst film/layer 200, affects the performance of the AMFC, as shown and described below with reference to FIG. 3. Specifically, the ratio of the volume of the ionomer material to the volume of the silver nano-powder is less than identified in certain reported prior art formulations, as well as our own previous formulations, and is near 1:1 (with a required weight ratio of 1:9). In a preferred embodiment of the invention, the volume ratio of anion conducting ionomer to metal catalyst is a function of the specific ionomer employed with the silver nano-powder catalyst, and includes a range of about 1:0.7 to about 1:1.5, and preferably a range of about 1:0.9 to about 1:1.1.

The volume ratio is relatively lower than the volume ratio of 2:1 of ionomer-to-catalyst that has been reported previously in the prior art for the highest AMFC performance achieved. (See, for example, P. C. Lim, S. H. Ge, and C. Y. Wang, Abstract 1073 of the Electrochemical Society Meeting in Honolulu, Hi., October 2008.) The lower volume ratio according to the invention helps to prevent over-flooding of the cathode catalyst formed with recast ionomer. This helps to prevent the undesirable consequences of disconnected electronic paths within the cathode catalyst film/layer 200 and deposits of recast ionomer crusts along the interfaces of the cathode catalyst with the alkaline membrane 210 and the cathode catalyst with the gas diffusion layer 220. The lower volume ratio also helps to improve bonding of the catalyst layer to the membrane surface by formation of catalyst layer anchor sites in the form of metal particles embedded in the membrane surface.

Referring to FIG. 3, and with further reference to FIG. 2, the graph illustrates the comparative performance results in terms of power density vs. current density of four AMFCs. AMFCs tested employed different CCMs, including one AMFC based on Pt catalysts (curve designated "University II" in FIG. 3), another AMFC using a carbon supported cobalt cathode catalyst (curve designated "Industry" in FIG. 3), and another using non-Pt cathode and anode catalysts (curve designated "University I" in FIG. 3). The performances of these three CCMs are compared in the graph of FIG. 3 with the performance of a CCM prepared with a silver nano-powder catalyst according to the invention (curve designated "CellEra" in FIG. 3), including the nano-dispersed, high void fraction silver powder mixed with recast OH-conducting ionomer at optimized volume ratio to form an ultra-thin, unsupported cathode catalyst layer.

The results indicate that the performance level of the AMFC with the CCM 100 and the silver nano-powder cathode catalyst film/layer 200 according to the invention is higher than the performance levels of the other tested AMFCs. These results indicate that an AMFC with the silver nano-powder catalyst and an optimal volume ratio of ionomer-to-catalyst in the catalyst film/layer can achieve performance levels in the same range as fuel cells employing platinum group or precious metal catalysts.

Without limiting the invention to any particular explanation of the positive performance results shown in FIG. 3, one may interpret these results are due, at least in part, to the high electronic conductivity of the silver metal particles 202 and the micro- and nano-structure of the catalyst film/layer 200 that the silver nano-powder helps to create.

The micro and nano-structure of the catalyst film/layer 200 can be attributed to the relatively high surface area, e.g., greater than 20 $m^2$ per g, that the average silver particle size defines, and to the relatively high powder void fraction of the silver nano-powder. While the density of bulk silver is 10.6 $g/cm^3$, the effective density ("tap" density) of the silver nano-powder is about 0.25 $g/cm^3$. This translates to a relatively high powder void fraction where about 97.5% of the silver nano-powder is void and the silver particles occupy about 2.5% of the total volume. In a preferred embodiment of the invention, the powder void fraction is over 90%. This relatively high degree of "openness" of the silver nano-powder is due to the combination of an effective mode of preparation of the silver catalyst as a dry nano-powder. Consequently, the well-separated individual nano-particles 202 of the dry silver powder, and the ultra-open structure of the powder, help to ensure the high probability that the silver particles mix intimately with the ionomer material at the micro and sub-micrometer level to achieve effective mixing of these components at the nanometer scale.

In addition, the high electronic conductivity of the silver particles 202 and the micro- and nano-structure of the cathode catalyst film/layer 200, or the CCM 100 according to the invention, creates an AMFC that demonstrates a low value for the cell high frequency resistance (HFR). The AMFC demonstrates an HFR of about 0.20 ohm×$cm^2$ for a given ionomer when the silver cathode catalyst film/layer 200 according to the invention is employed with the CCM 100. This HFR achieved is at least about twenty to thirty percent (20-30%) less than that achieved by an AMFC employing the same ionomer with other types of catalysts. The high electronic conductivity of the silver particles and the micro- and nano-structure of the catalyst layer help to create the low HFR.

As shown in FIG. 3, the AMFC and, more particularly, the CCM 100 constructed with the silver-based cathode catalyst film/layer 200 according to the invention achieve for the first time an AMFC power density comparable to the power densities that proton conducting membrane fuel cells achieve using more expensive platinum catalysts. Specifically, the AMFC achieves a maximum power density higher than 300 mW/$cm^2$ of operating membrane area. These results demonstrate that AMFCs using non-Pt group catalysts achieve performance levels well within the range that is achieved with fuel cells using precious metal catalysts.

Not less importantly, we have demonstrated a significant improvement in AMFC performance stability when moving over from cathode catalyst layers based on carbon-supported Pt, or unsupported Pt, to cathode catalyst layers based on nano-silver particles. The specific nano-structure of the silver powder has allowed the use of unusually low ionomer levels in the ink, while yielding high cathode performance and, thereby, facilitated formation of anchor sites for the catalyst layer based on metal particle penetration into the membrane surface. Formation of such anchoring sites may apparently be further facilitated by longer exposure of the membrane surface to a solvent that swells it to some degree.

Figure 4:
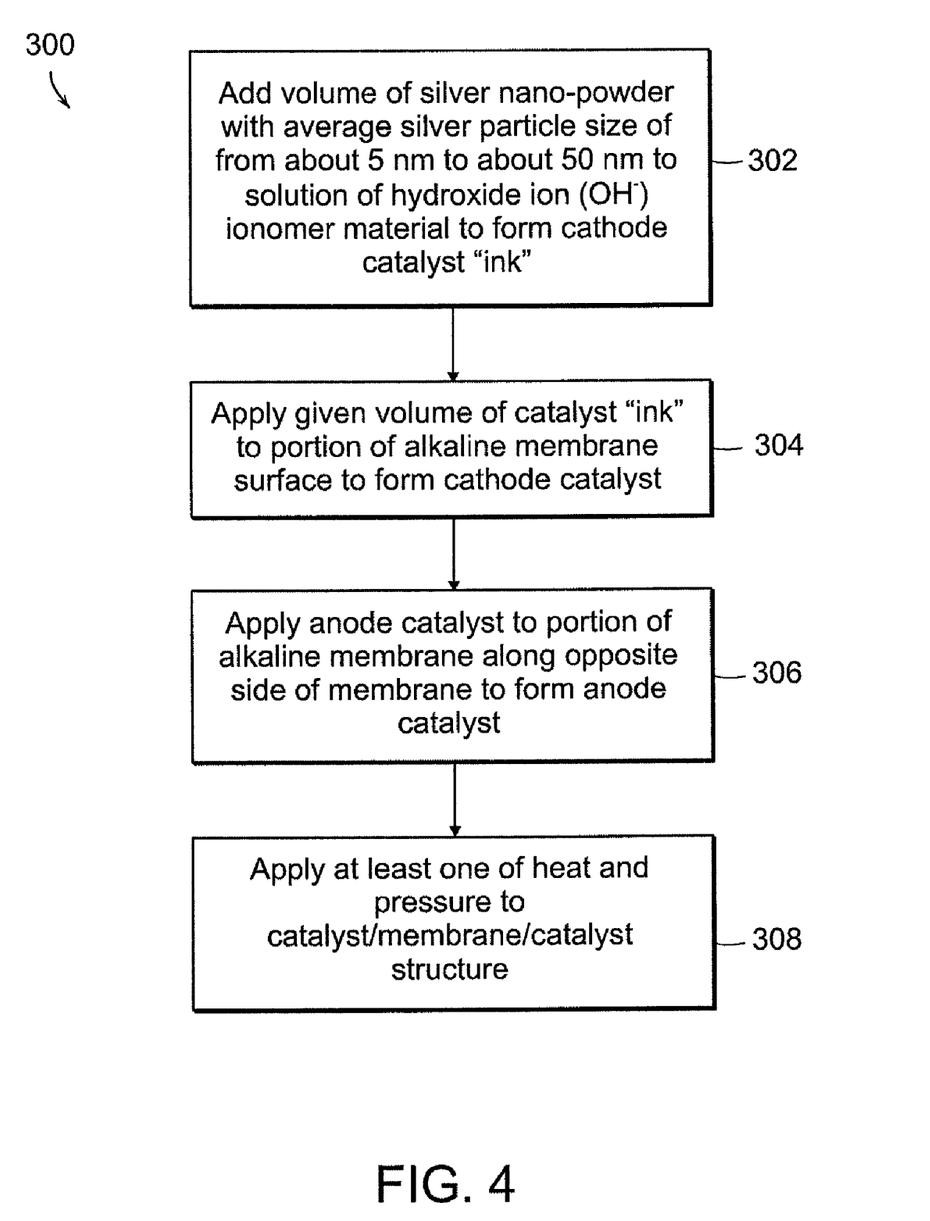
FIG. 4 is a block flow diagram that illustrates a method according to another aspect of the invention of making the cathode catalyst film/layer and the cathode catalyst-coated, ion conducting membrane (CCM)

Referring to FIG. 4, in another aspect, the invention provides a method 300 of forming the silver cathode catalyst film/layer 200 and the CCM 100 for use in an AMFC. The method 300 shown in the block flow diagram illustrated in FIG. 4 is exemplary only and not limiting. The method 300 may be altered, e.g., by having stages added, removed, and/or rearranged. In general, the method 400 includes at least forming the silver-based cathode catalyst film/layer 200 along the cathode side of the alkaline membrane 210 to define the cathode side of the CCM 100.

At stage 302, a given volume of a silver nano-powder having silver particles with an average particle size of about 5 nm to about 50 nm in diameter, and having a void powder fraction over 90%, is added to a solution of a given volume of an hydroxide ion ($OH^-$) conducting ionomer material. The volume ratio of ionomer material to silver nano-powder is within a range of from about 1:0.7 to 1:1.5, and is preferably near 1.1. The solution is mixed to disperse the silver particles substantially throughout the solution and to form a catalyst mixture or "ink."

At stage 304, a given volume of the catalyst "ink" is applied, e.g., sprayed, directly to at least a portion of the surface of the alkaline membrane 210 along the cathode side of the membrane 210 to form a film or layer 200 of the silver catalyst and to help to define the cathode side of the CCM 100.

At stage 306, an anode catalyst film/layer is applied similarly, e.g., sprayed, directly to at least a portion of the surface of the alkaline membrane 210 along the anode side of the membrane 210, opposite to the cathode side of the membrane 210, to form an anode film or layer 200 and to help to define the anode side of the CCM 100. The membrane 210 is thereby positioned between the cathode and anode catalysts.

At stage 308, subsequent to application of the silver-based cathode catalyst film or layer 200 and the anode catalyst film/layer to the membrane 210 at least one of heat and pressure are applied to the anode catalyst/membrane/cathode catalyst structure to help to bond securely the catalyst films/layers to the surfaces of the membrane 210.

Figure 5:
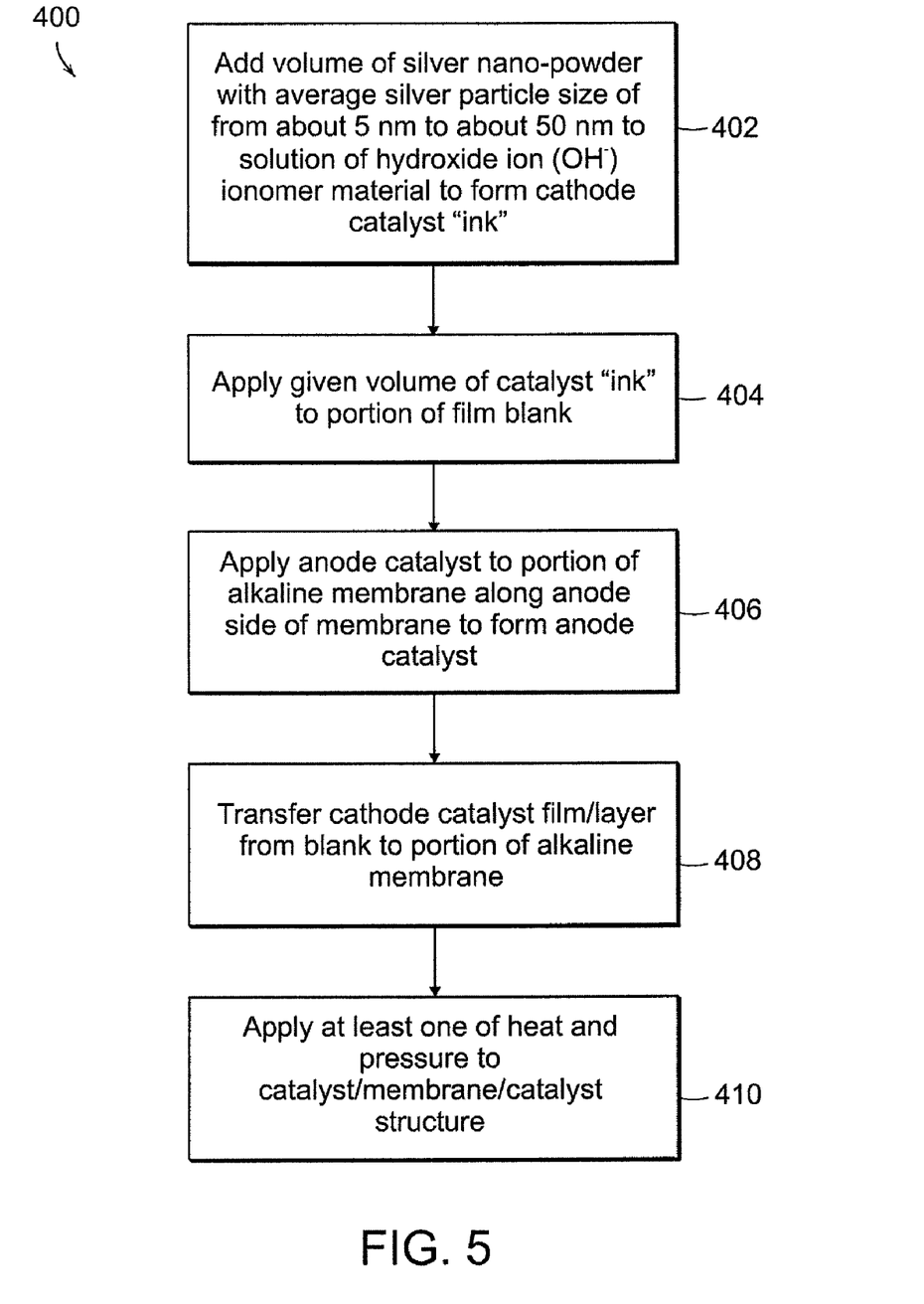
FIG. 5 is a block flow diagram that illustrates an alternative method according to a further aspect of the invention of making the cathode catalyst film/layer and the cathode catalyst-coated, ion conducting membrane (CCM).

In an alternative embodiment of the method 300, FIG. 5 illustrates another aspect of the invention providing an alternative method 400 of forming the silver cathode catalyst film/layer 200 and the CCM 100. The method 400 may be altered, e.g., by having stages added, removed, and/or rearranged. In general, the method 400 includes at least forming the silver cathode catalyst film/layer 200 along a film "blank" before applying the film or layer 200 to the alkaline membrane 210.

At stage 402, a given volume of a silver nano-powder having silver particles with an average particle size of about 5 nm to about 50 nm in diameter, and having a void powder fraction over 90%, is added to a solution of a given volume of an hydroxide ion ($OH^-$) conducting ionomer material. The volume ratio of ionomer material to silver nano-powder is within a range of from about 1:0.7 to 1:1.5, and is preferably near 1.1. The solution is mixed to disperse the silver particles substantially throughout the solution and to form a catalyst mixture or "ink."

At stage 404, a given volume of the catalyst "ink" is applied, e.g., sprayed or screen printed, directly to at least a portion of a surface of a film "blank", e.g., a Teflon®-coated film blank, to form a film or layer 200 of the silver catalyst along the surface of the blank.

At stage 406, an anode catalyst film/layer is applied, e.g., sprayed, directly to at least a portion of the surface of the alkaline membrane 210 along the anode side of the membrane 210 to form an anode film or layer 200 and to help to define the anode side of the CCM 100.

At stage 408, subsequent to application of the silver-based cathode catalyst film or layer 200 on the film blank surface, the film or layer 200 is transferred to a surface of the alkaline membrane 210 along the cathode side of the membrane 210, opposite to the anode side of the membrane 210, via a decal transfer process that is well known in the art. The applied film or layer 200 covers at least a portion of the membrane surface. The membrane is thereby positioned between the cathode and anode catalyst layers.

At stage 410, subsequent to application of the silver-based cathode catalyst film or layer 200 and the anode catalyst film/layer to the membrane 210 at least one of heat and pressure are applied to the anode catalyst/membrane/cathode catalyst structure to help to bond securely the catalyst films/layers to the surfaces of the membrane 210.

EXAMPLE I

An exemplary silver-based catalyst formulation or "ink" was prepared by mixing silver nano-particles 202 with a solution of quaternary ammonium-functionalized polymer (QAFP) in certain proportions to form a catalyst ink. In one specific embodiment, the silver nano-particles 202 are mixed with a solution of about 4% to about 5% QAFP in methanol or propanol. The silver nano-powder is added at ten times the weight of the QAFP. Water is added at about 30% of the volume of methanol, and ethylene glycol is added at the level of about 0.5% of the total ink volume. The catalyst ink is ultrasonicated for about 10 minutes, and then mixed, e.g., with a magnetic stirrer, for about one hour. The catalyst ink is ultrasonicated again for about 10 minutes, and then applied, e.g., sprayed or screen-printed, on at least a portion of the cathode side of the membrane 210, or on at least a portion of a Teflon® film blank, with the membrane or blank held down on a vacuum table heated at temperature(s) from about 60° C. to about 80° C. When applied to the Teflon® film blank, the catalyst layer is next decal-transferred to the membrane surface. After catalyzing one major surface, the membrane is next flipped over and catalyzed in a similar manner on the opposite major surface, to form the catalyst coated membrane (CCM) for the AMFC where the CCM is an anode catalyst/membrane/cathode catalyst assembly.

EXAMPLE II

Cells prepared by the process described in Example I had CCMs with a cathode Pt catalyst, requiring a volume ratio of ionomer:metal of 4:1 to secure high performance. These cells lost performance at an ever increasing rate under current demand of 0.3-0.4 $A/cm^2$ ending up consistently with a steep drop of the cell voltage down to zero before the end of the second day of continuous operation. Other cells prepared according to Example I had a CCM with a cathode nano-silver catalyst, requiring a volume ratio of ionomer:metal of only 1:1.5 to secure high performance. These cells exhibited a significantly slower, constant rate of power loss at 0.3% the initial power output per hour.

The steep drop of the cell voltage down to zero was not seen in any of the cells with the nano-silver cathode catalyst over operation times of several hundred hours.

EXAMPLE III

CCMs prepared according to Example I with nano silver cathode catalysts were prepared by air-spray application of the ink to a membrane placed on a heated vacuum table and exhibited a constant rate of power loss at about 0.3% of the initial power output per hour. Other CCMs were prepared in the same way and with a similar ink formulation, but using n-propanol as the only solvent (no water added) and applying the ink by screen printing to the membrane at room temperature. The screen-printed CCMs exhibited superior stability, losing only 0.1% of the initial power per hour over 300-400 hours.

Having thus described at least one illustrative embodiment of the inventions, various alterations, substitutions, modifications and improvements in form and detail will readily occur to those skilled in the art without departing from the scope of the inventions. Such alterations, substitutions, modifications and improvements are intended to be within the scope and spirit of the inventions. Other aspects, functions, capabilities, and advantages of the inventions are also within their scope. Accordingly, the foregoing description is by way of example only and is not intended as limiting.

In addition, in describing aspects of the invention, specific terminology is used for the sake of clarity. For purposes of description, each specific term is intended to at least include all technical and functional equivalents that operate in a similar manner to accomplish a similar purpose. In some instances where a particular aspect of the invention includes a plurality of system elements or method steps, those elements or steps may be replaced with a single element or step; likewise, a single element or step may be replaced with a plurality of elements or steps that serve the same purpose. Further, where parameters for various properties are specified herein for aspects of the inventions, those parameters can be adjusted or rounded-off to approximations thereof within the scope of the invention, unless otherwise specified.

We claim:

1. A catalyst coated membrane (CCM) for use in an alkaline membrane fuel cell (AMFC) comprising:
    an anion conducting alkaline membrane; and
    a catalyst layer applied adjacent the membrane, wherein the catalyst layer comprises:
        (a) a metal nano-powder; and
        (b) an ion conducting ionomer.

2. The CCM of claim 1 wherein the metal nano-powder comprises silver-containing nano-particles.

3. The CCM of claim 1 wherein the metal nano-powder has an effective density of about 0.25 g/cm$^3$.

4. The CCM of claim 1 wherein the ionomer comprises a polymer with a poly(arylene) backbone.

5. The CCM of claim 2 wherein the weight ratio of the ionomer to the silver nano-particles is about 0 to 10%.

6. The CCM of claim 2 wherein the silver-containing nano-particles comprise a silver alloy.

7. The CCM of claim 2 wherein the silver nano-particles form an open nano-powder structure.

8. The CCM of claim 2 wherein the volume ratio of ionomer:silver is in a range of about 1:0.7 to about 1:1.5.

9. The CCM of claim 8 wherein the volume ratio is in a range of about 1:0.9 to about 1:1.1.

10. The CCM of claim 2 wherein the silver-containing nano-particles are mixed with the ion conducting ionomer to form an ink which is applied to the anion conducting membrane by spraying.

11. The CCM of claim 10 wherein the membrane is positioned during ink application on a heated vacuum table.

12. The CCM of claim 11 wherein the dry membrane is exposed to a solvent, the solvent selectively swelling the membrane surface to promote catalyst layer bonding to the membrane surface.

13. The CCM of claim 1 wherein the metal nano-powder and ionomer are applied to the anion conducting alkaline membrane by screen printing onto the membrane.

14. The CCM of claim 2 wherein the silver-containing nano-powder and ionomer are mixed to form an ink and are applied to a Teflon®-coated film blank, the blank serving as a platform to:
    (a) support the metal nano-metal and ionomer and;
    (b) transfer the ink to the membrane surface.

15. The CCM of claim 10 wherein the ink is comprised of a mixture of silver containing nano-particles and a solution of an OH-ion conducting ionomer in a solvent.

16. The CCM of claim 15 wherein the OH-ion conducting ionomer is selected from among poly(arylenes) with tetra-alkyl ammonium hydroxide functional groups of functional group densities between 1.5 and 3.5 milli-equivalents per gram, the selecting being based on the ability to absorb liquid water to increase ionic conductivity and to retain hydration in the cathode catalyst layer.

17. The CCM of claim 2 wherein the silver-containing particles are a size from about 5 nm to about 50 nm in diameter.

18. The CCM of claim 17 wherein the silver-coating particles have a void powder factor over about 90%.

19. A method of making a catalyst coated membrane (CCM), composing the steps of:
    (a) providing a source of silver-containing nano-particles;
    (b) providing a source of hydroxide ion OH-conducting ionomer material;
    (c) adding the silver-containing nano-particles to a solution of the OH-ionomer material to form a catalyst ink;
    (d) applying the catalyst ink to a cathode side surface of an alkaline membrane; and
    (e) applying one or more of heat and pressure to catalyst ink and membrane to secure the ink to the membrane.

20. A cathode catalyst layer for use in a catalyst coated membrane (CCM) in an alkaline membrane fuel cell (AMFC) comprising:
    (a) a metal nano-powder; and
    (b) an ion conduction ionomer.

21. The cathode catalyst layer of claim 20 wherein the metal nano-powder comprises silver-containing particles.

* * * * *